United States Patent [19]
Muenchinger

[11] 3,885,480
[45] May 27, 1975

[54] TORQUE-TRANSMITTING ARRANGEMENT FOR FASTENERS AND THE LIKE

[75] Inventor: Herman G. Muenchinger, South Dartmouth, Mass.

[73] Assignee: Research Engineering & Manufacturing Inc., New Bedford, Mass.

[22] Filed: Dec. 7, 1973

[21] Appl. No.: 422,836

[52] U.S. Cl. ............ 81/121 R; 85/45; 85/9 R
[51] Int. Cl. ............................ B25b 13/06
[58] Field of Search ........ 81/121 R, 119, 90 B; 85/45, 32 R, 9 R

[56] References Cited
UNITED STATES PATENTS
2,353,531   7/1944   Whitney .................................. 85/45
FOREIGN PATENTS OR APPLICATIONS
156,456   7/1939   Germany ............................ 85/45
211,159   11/1940   Switzerland .......................... 85/45
1,685   1/1884   United Kingdom ................. 85/32 R Primary Examiner—James L. Jones, Jr.
Attorney, Agent, or Firm—Olson, Trexler, Wolters, Bushnell & Fosse, Ltd.

[57] ABSTRACT

An article of manufacture, such as a threaded fastener or torque tool for driving the same, comprises a body with a regular hexagon portion that is modified to provide splines having force-transmitting or force-receiving walls, as the case may be, radially of the central axis of rotation of the body. In the case of a threaded fastener, these radial walls are on the head of the fastener for engagement by a torque tool for applying forces perpendicular to the walls so that there is substantially no lost component of torsional effort in threading or unthreading of the fastener. The partial hexagonal flats that remain also permit driving of the fastener with a conventional wrench.

9 Claims, 5 Drawing Figures

PATENTED MAY 27 1975 3,885,480

TORQUE-TRANSMITTING ARRANGEMENT FOR FASTENERS AND THE LIKE

BACKGROUND OF THE INVENTION

This invention relates to improved torque-transmission arrangement, and is particularly suitable for application to threaded fasteners and to torque tools for driving such fasteners.

In the conventional hexagonal drive for screws or bolts, the wrench or torque tool tends to engage the hexagonal head or socket, as the case may be, in such a manner that there are components of force radially of the axis of rotation of the screw. These radial components tend to be lost in that they do not contribute to the torque applied to the screw, it being understood that the torque applied to the screw is effected by that component of force which is perpendicular to the radius extending from the axis of rotation of the fastener. The lost component and the torque-creating force perpendicular thereto produce a resultant force which tends to cause metal movement in the screw head resulting in distortion that may permanently deform the driving end of the screw. To reduce the possibility of this distortion and to provide optimum engagement with the drive wrench, the corners of the hexagon are made as sharp as possible and the distance across the flats are held to relatively close tolerances.

OBJECTS AND SUMMARY OF THE INVENTION

It is an object of this invention to provide an article of manufacture, such as a fastener, a wrenching tool, or the like, in which the primary wrenching effort is developed by forces applied normal to walls that lie in planes that are radial to the axis of rotation of the article, whereby there is little or no lost component of torsional effort.

A further object of this invention is to provide an article of the type stated which, in effect, provides the aforesaid radial walls by incorporating splines of novel configuration on what would otherwise be a regular hexagon.

A still further object of this invention is to provide an article of the type stated in which the tolerance across the flats of the hexagon are not as critical as would otherwise be the case for a standard hexagonal drive.

Yet another object of this invention is to provide a threaded fastener having the foregoing characteristics and partial hexagonal flats, and which may, if desired, be wrenched for service purposes by a standard hexagonal socket wrench or key.

An additional object of this invention is to provide an article of the type stated which permits higher driving torque than would otherwise be possible in a comparable hexagonal configuration and which, at the same time, helps prevent distortion or burrs from being formed on the driven piece.

A still further object of this invention is to provide an article with the geometrical configuration of the type stated which facilitates easy engagement between companion driving and driven members.

Yet another object of this invention is to provide a novel head or end configuration for a threaded fastener which can be readily shaped by a suitable heading die of proper geometry without the necessity of providing sharp corners at the points of the hexagon or close tolerances across the flats.

In accordance with the foregoing objects an article of manufacture in accordance with the present invention comprises a body having a central axis, a first series of surfaces each being equally spaced from said central axis, said surfaces each having opposite ends and being disposed about said central axis with said opposite ends of each surface being circumferentially spaced from the adjacent surfaces of said series, said surfaces having flat portions between their opposite ends and with the flat portions being in planes that intersect to form a regular hexagon that is centered on the central axis. The body at corresponding ones of said opposite ends have a second series of surfaces respectively lying in planes that intersect the central axis, and the body at the corresponding others of said opposite ends have a third series of surfaces respectively lying in other planes that intersect the central axis. The surfaces of said second series all face circumferentially in the same direction and the surfaces of the third series all face in the opposite circumferential direction.

An article with the aforesaid geometry is primarily intended to be embodied into the head of a threaded fastener and also into a companion torque-drive tool for the fastener. The novel spline configuration may be externally of the head or internally thereof in the case of a socket-type head. The drive tool may be a socket wrench or a key. The novel spline configuration may also be embodied into other articles of manufacture, in particular a die for shaping or heading the end of the fastener. The invention also contemplates the combination of a fastener and a drive tool such that the forces applied by the drive tool during threading and unthreading of the fastener are substantially normal to the radial torque-receiving walls of the splined head.

DETAILED DESCRIPTION

Figure 1:
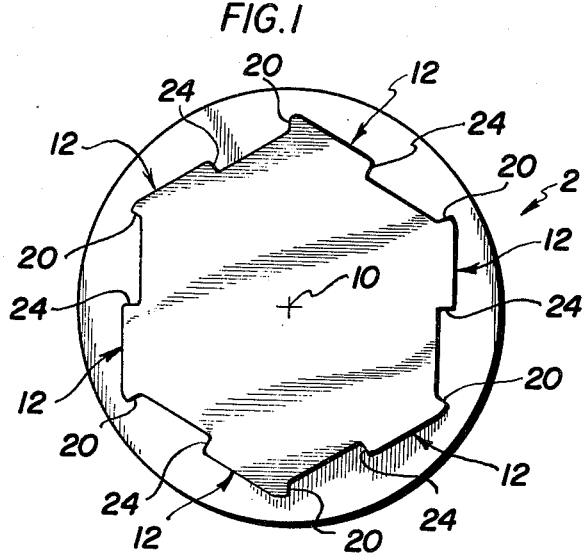
FIG. 1 is a top plan view of a threaded fastener in accordance with the present invention, the fastener having an externally splined head.
Figure 2:
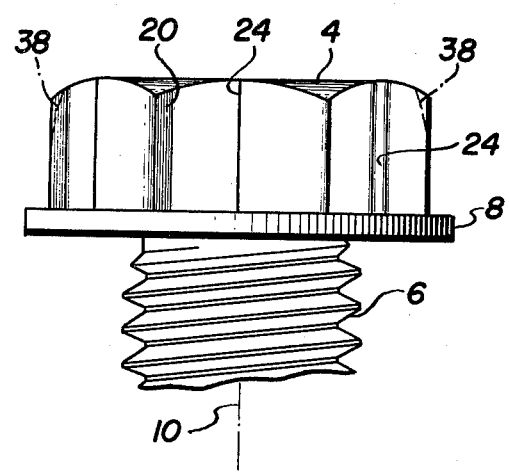
FIG. 2 is a fragmentary elevational view of the fastener of FIG. 1.
Figure 5:
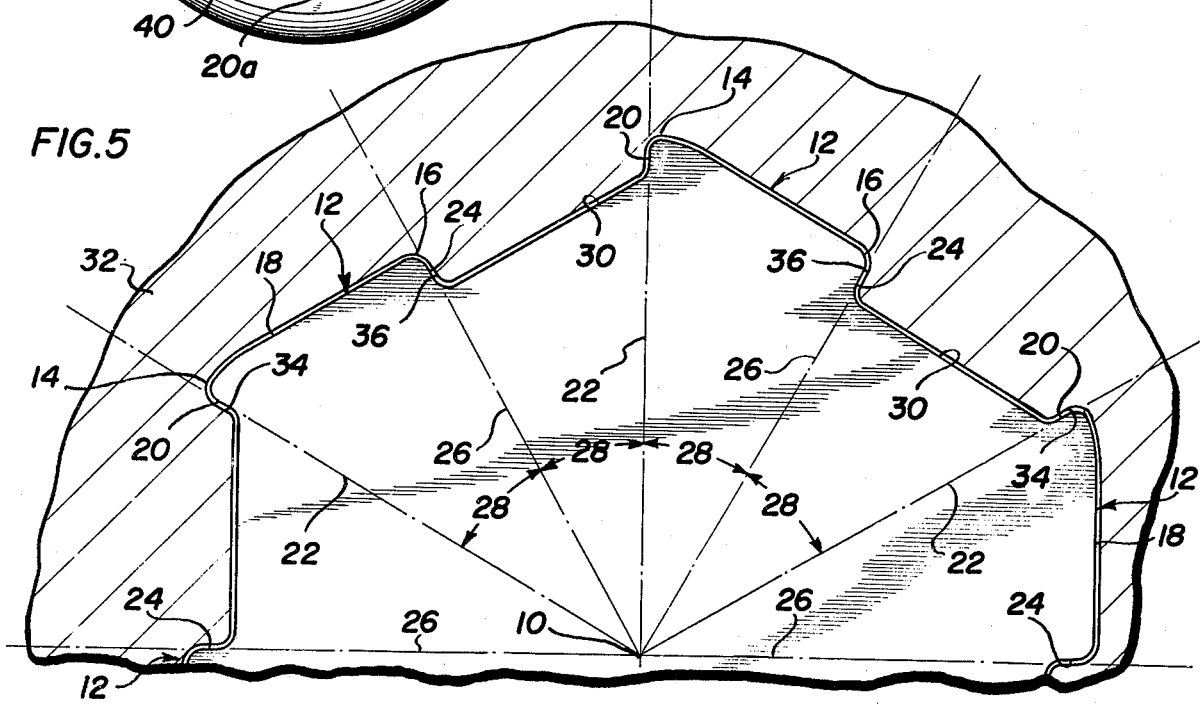
FIG. 5 is a fragmentary top plan view, on an enlarged scale, of a portion of the fastener of FIG. 1 and showing the same engaged by a mating drive tool.

Referring now in more detail to the drawing, which illustrates preferred embodiments of the present invention, FIGS. 1, 2, and 5 show a fastener to having a head 4 at one end thereof and a helically threaded shank 6. In the present form illustrated, the head 4 integrally includes a washer 8. The threaded shank 6 and the head 4 are both centered on the central axis 10 of the fastener.

The head 4 is externally splined to provide a first series of spaced apart surfaces 12 each of which is equally spaced from the central axis 10. The surfaces 12 each have opposite ends 14, 16 which are circumferentially spaced respectively from the next adjacent of the surfaces 12. Between each of its opposite ends 14, 16 each surface 12 has a flat portion 18. These flat portions 18 lie in planes which, if extended to their intersections, would form a regular hexagon that is centered on the axis 10.

At the ends 14, the splined configuration provides a second series of surfaces 20 which respectively lie in planes 22 that intersect the central axis 10. It will be noted that these surfaces 20 are substantially at the points of the hexagon referred to in the previous paragraph. These surfaces 20 provide torque-receiving walls for engagement by a torque tool for threading the fastener into a workpiece. A third series of surfaces 24 are provided at the respective ends 16, and these surfaces 24 respectively lie in the planes 26 which also intersect the central axis 10. The surfaces 24 face circumferentially in the same direction, which direction is opposite to the circumferential direction of facing of the surfaces 20. Thus, the surfaces 24 provide torque-receiving walls for engagement by a torque tool for unthreading the fastener from the workpiece.

The surfaces 20 are thus seen to be alternately circumferentially disposed with respect to the surfaces 24. In the form of the invention herein shown, the surfaces 20, 24 are substantially equally spaced from one another, namely such that the two groups of planes 22, 26 form a series of equal angles 28 having a common vertex at the axis 10 which lies in each of the planes 22, 26. The radially inner ends of the surfaces 20, 24 are joined by surfaces 30 which may be flat and parallel to the flats 18.

The fastener 2 is preferably driven by a mating socket wrench 32 which may have a socket geometry similar to the splined configuration of the head 4, previously described. This is shown in FIG. 5. In any event, the wrench 32 has a series of circumferentially spaced surfaces 34, 36 for respective engagement with the bolt head surfaces 20, 24 to effect threading or unthreading the fastener, as the case may be, relative to the workpiece. The wrench surfaces 34, 36 are in planes that substantially coincide with the planes of the surfaces 20, 24. As a result, the forces against the surfaces 20, 24 are normal to the radial planes 22, 26 to provide the driving torque for the fastener. There is little or no lost component of torsional effort and substantially no camming of the metal or metal distortion in the head 4. Furthermore, because of the improved wrenching capabilities of the fastener 2, the head 4 may have a lower profile (viewed from FIG. 2) than might otherwise be required in a comparable conventional hexagonal headed screw.

The head 4 may be readily formed at low cost by cold-heading dies in accordance with conventional techniques. In this regard the surface ends 14, 16 previously described, need not be sharp but may be somewhat rounded as shown best in FIG. 5, which reduces the cost of manufacture of the fastener. The surfaces 30 may be radially inset sufficiently so that even with the rounded ends 14, 16, the surfaces 20, 24 will have adequate areas for wrench engagement. Also, the tolerance across opposing flats 18 need not be held to the critical limits normally required of conventional hexagonal head screws. Nevertheless, the head 4 is capable of being driven with a conventional socket wrench or adjustable wrench for service purposes although the wrenching effect will be less than if the proper wrenching tool, described herein, is used.

It is also possible to taper the edges of the head at the surface ends 14 (i.e. at the hexagon points) as shown in broken lines at 38 in FIG. 2. This optional feature facilitates engagement of the head 4 with the driving socket.

Figure 3:
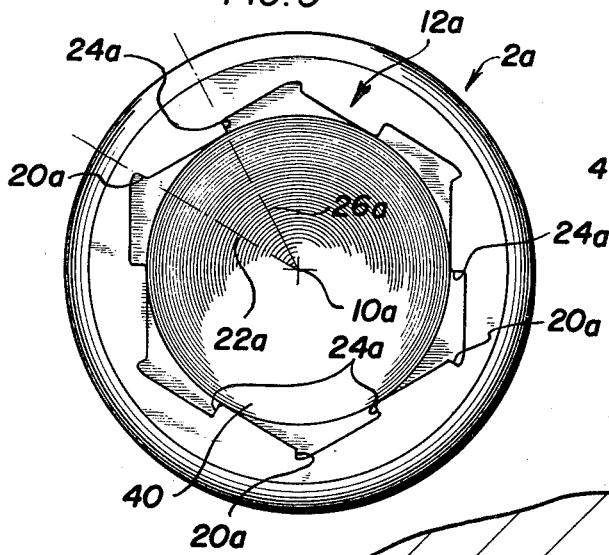
FIG. 3 is a top plan view of a fastener in accordance with the present invention but with the fastener having an internally splined or socket head.
Figure 4:
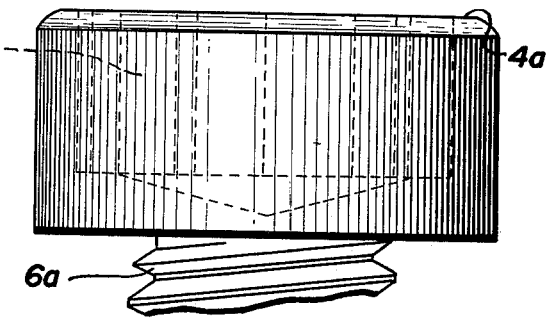
FIG. 4 is a fragmentary elevational view of the fastener of FIG. 3.

It is also possible to provide a fastener 2a with a socket type head 4a that is internally splined wih a geometry that is the same as that of the externally splined head 4. Such a fastener is shown in FIGS. 3 and 4. The fastener 2a has a threaded shank 6a and a splined socket 40. The parts of the splined socket bear the same reference numerals as the corresponding parts of the head 4 followed by the letter $a$. Thus, further detailed description of the socket 40 is believed to be unnecessary. The drive tool for the socket is a key (not shown) that fits into the socket and is preferably of a companion shape to that of the socket. In such case the surfaces 20a constitute a second series of surfaces for receiving the key to drive the fastener into the workpiece while the surface 24a constitute a third series of surfaces for receiving the key to unthread the fastener from the workpiece. The surfaces 30a lie in planes which, if extended, form a regular hexagon, and these surfaces may be engaged by a conventional hexagon key for driving the fastener 2a for service purposes.

The invention is claimed as follows:

1. An article of manufacture comprising a body having a central axis, a first series of surfaces each being equally spaced from said central axis, said surfaces each having opposite ends and being disposed about said central axis with said opposite ends of each surface being circumferentially spaced from the adjacent surfaces of said series, said surfaces having flat portions between their opposite ends, said flat portions being in planes that intersect to form a regular hexagon that is centered on said axis, the body at corresponding ones of said opposite ends having a second series of surfaces respectively lying in planes that intersect said central axis, and the body at the corresponding others of said opposite ends having a third series of surfaces respectively lying in other planes that intersect said central axis, the surfaces of said series all facing circumferentially in the same direction and the surfaces of said third series all facing in the opposite circumferential direction, the surfaces of said second series extending to radial distances from said central axis that are greater than the distances that the surfaces of said third series extend from said central axis.

2. An article according to claim 1 wherein the planes in which said second and third surfaces lie form a series of equal angles having a common vertex at said axis.

3. An article according to claim 1 which is a fastener having a threaded shank centered on said axis, said body constituting an end portion of said fastener, said second and third series of surfaces being force-receiving walls for threading and unthreading the fastener from the workpiece.

4. An article according to claim 3 in which said end portion is a head for external engagement at said walls by a torque-tool.

5. An article according to claim 3 in which said end portion is a socket for internal engagement at said walls by a torque-tool.

6. An article according to claim 1 which is a torque-tool for driving a fastener.

7. An article according to claim 3 in combination with a torque-tool having means for engaging the respective force-receiving walls such that the forces applied by said torque-tool during threading and unthreading of the fastener are substantially normal to said walls.

8. An article according to claim 3 wherein the planes in which said second and third surfaces lie form a series of equal angles having a common vertex at said axis.

9. A combination according to claim 7 in which said means for engaging the force-receiving walls are surfaces that substantially coincide with said force-receiving walls and are substantially in planes that form a series of equal angles having a common vertex at said axis.

* * * * *

UNITED STATES PATENT OFFICE
CERTIFICATE OF CORRECTION

Patent No. 3,885,480　　　　　　　　Dated May 27, 1975

Inventor(s)　　HERMAN G. MUENCHINGER

It is certified that error appears in the above-identified patent and that said Letters Patent are hereby corrected as shown below:

Col. 4, line 40, before "series" insert --second--

Signed and Sealed this eleventh Day of November 1975

[SEAL]

Attest:

RUTH C. MASON
*Attesting Officer*

C. MARSHALL DANN
*Commissioner of Patents and Trademarks*